(12) United States Patent
Kumar (10) Patent No.: US 8,730,023 B1
(45) Date of Patent: May 20, 2014

(54) FUEL GAUGE SYSTEM

(76) Inventor: Sivathanu B. Kumar, Tampa, FL (US)

( * ) Notice: Subject to any disclaimer, the term of this patent is extended or adjusted under 35 U.S.C. 154(b) by 379 days.

(21) Appl. No.: 12/931,368

(22) Filed: Jan. 31, 2011

Related U.S. Application Data (60) Provisional application No. 61/337,712, filed on Feb. 8, 2010, provisional application No. 61/399,742, filed on Jul. 16, 2010.

(51) Int. Cl.
*B60Q 1/00* (2006.01)
*G09F 9/00* (2006.01)
*G08B 29/00* (2006.01)
*G08B 21/00* (2006.01)

(52) U.S. Cl.
USPC ........ 340/450.2; 340/450; 340/438; 340/459; 340/457; 340/461; 340/511; 340/603; 340/612; 340/623; 340/460

(58) Field of Classification Search
USPC .............. 340/450, 450.2, 461, 462, 460, 612, 340/539, 618
See application file for complete search history.

(56) References Cited

U.S. PATENT DOCUMENTS

| | | | | |
|---|---|---|---|---|
| 3,938,117 A | * | 2/1976 | Bozoian | 340/527 |
| 4,967,181 A | * | 10/1990 | Iizuka et al. | 340/450.2 |
| 5,532,673 A | * | 7/1996 | Olson et al. | 340/450.2 |
| 6,508,119 B2 | * | 1/2003 | Beck, II | 73/291 |
| 6,822,565 B2 | * | 11/2004 | Thomas et al. | 340/539.1 |
| 2012/0227737 A1 | * | 9/2012 | Mastrototaro et al. | 128/203.14 |

* cited by examiner

*Primary Examiner* — Jennifer Mehmood
*Assistant Examiner* — Muhammad Adnan (57) ABSTRACT

A fuel gauge system has a fuel gauge unit, a processing unit, display units, input units, and a GPS navigation system unit with means to connect to other connections and which, by audio and visual aids, informs and alerts an operator of a vehicle of the amount of fuel remaining and range and which allows the operator to manipulate and select and alter the levels, the volume and frequency intervals at which the alerts are sounded, emitted and displayed.

13 Claims, 5 Drawing Sheets

FUEL GAUGE SYSTEM

RELATED APPLICATION

This application is based upon and claims the benefit of U.S. Provisional Patent Application 61/337,712 filed Jan. 31, 2010 and U.S. Provisional Patent Application 61/399,742 filed Jul. 16, 2010, which applications are incorporated herein by reference.

BACKGROUND OF THE INVENTION

1. Field of the Invention

The present invention relates to a fuel gauge system and, more particularly pertains to tracking and alerting drivers to fuel levels and related information.

2. Description of the Prior Art

The use of fuel gauge systems of known designs and configurations is known in the prior art. More specifically, fuel gauge systems of known designs and configurations previously devised and utilized for the purpose of tracking fuel use and ranges are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe fuel gauge system constructed in accordance with the principles of the present invention.

In this respect, the fuel gauge system according to the present invention substantially departs from the conventional concepts and designs of the prior art, and in doing so provides an apparatus primarily developed for the purpose of tracking and alerting drivers to fuel levels and related information.

Therefore, it can be appreciated that there exists a continuing need for a new and improved fuel gauge system which can be used for tracking and alerting drivers to fuel levels and related information. In this regard, the present invention substantially fulfills this need.

SUMMARY OF THE INVENTION

Description

A device primarily used in vehicles such as but not limited to automobiles and trucks comprising of at least a fuel level gauges unit, a processing unit, display units, input units and a GPS navigation system unit. This device by means of audio and visual aids informs and or alerts the operator of the vehicles the levels or a ranges of levels of fuel and the device also having the means by which the operator can select set and alter the range or the levels at which these information and or alerts are emitted and or displayed and also having the provision to change the type of information, messages and alerts including the volume and the frequency of such alerts. The operator further have the option to program, record or input different or distinctive types alerts for different levels and range of levels of fuel. The integration of the processor unit with a GPS navigation system unit enables an operator to obtain the location, direction and distance to fuel stations based upon factors such as the fuel level and distance to the fuel stations as determined by the operator.
Functions in Part or as Whole.

The following are the detailed description of the units of systems described above:

A fuel level gauges unit capable of measuring the levels of fuel and consisting of sensors and the interface and integration software and hardware to transfer this data to a processing unit.

The fuel cell gauges refers to gauges used to gauge (obtain) the amount or level of elements such as but not limited to liquids, gas, vapor and electricity. For the scope of this invention the term fuel used for describing the invention is not self limiting to only elements used as fuel.

The term fuel refers to elements such as but not limited to fuels, liquids, solids, gas, vapor and electricity. For the scope of this invention the term the term fuel is not self limiting to only elements used as fuel.

A processing unit, consisting of associated hardware, microprocessors, software, programmer means (200), memory/storage means (201), receiver/transmitter component (203) and, GPS integration hardware and software (207) and the programmer means further adapted to compute, analyze, process, integrate, interpret and to transmit the signals and data relayed from and to the fuel gauge unit, the display units, GPS system unit and data entered through the input unit by an operator. The processor unit has means to change or alter software programs through the use of USB ports.

The and the programmer means further adapted to enable an operator of this system to select pre installed programs installed in the memory/storage means of this system, manipulate to alter such program or enter and installed the operators own programs. The A processing unit operatively coupled to;

(A) Display units (output means) comprising multiple units of analog and digital display such as LCD lights touch screens, bars and indicator lights which displays the data received from the processing unit and also data entered by on operator using the input unit described hereunder. The different displays are placed on various locations for safety and convenience of the operator (B) Input units (input means) consisting of switches, key pads, touch screen inputs, joysticks and a microphone. These systems are grouped and also dispersed at various locations for the convenience of an operator.

(C) A global positioning system (GPS) navigation system comprising of software and hardware programmed to interface (207) and integrate with the processing unit of this device.

This system further has the means to connect to other connections such as but not limited to mobile network, cell phone net work, Wi-Fi network and blue tooth connections and thus enabling communication and retrieving of data through such connections and also enabling indirect connections to the GPS system to obtain GPS related data. The processing units and the programs of this system further having the means for obtaining necessary data in part or as whole from more than one source or networks and to be connected to components of other systems such as but not limited the computer, and fuel gauge of a vehicle, cell/smart phones and other communication devices.

The units of these systems have the means to be interconnected by wires or by wireless means.

Upon manipulation of this device using the input buttons, switches, touch screen, the joysticks and the microphone of the input unit and with the information available through the display unit, an operator of this device is able to set alerts and reminders when the fuel level drops to a level at which the operator chooses to be alerted or reminded. This invention also gives the operator various other options to select to suet the preferences needs and skill level of the operator. This invention is further adapted to enable an operator of this device to;

(a) vary, alter, preset, set and or select a level(s) and or range(s) of levels of the fuel (fuel) at which an audio and or visual alert(s) are emitted and or displayed and also the type of alerts, messages and information pertaining to such levels of the fuel is emitted or displayed, (b) Select and set alerts for one or more levels and ranges of levels of fuel level gauges, (c) Vary, alter and choose the type of audio alerts, messages and the information displayed, (d) Choose the frequency of the alerts and vary the intervals and messages, (e) Increase or decrease the volume of the alerts and messages, (f) To record sounds and tones of alerts and messages, (g) Select and set different alerts, tones and or information for different levels or ranges of levels of fuel level gauges and designate different types of alerts and messages for different set of levels or ranges of levels of fuel level gauges (fuel).

The above mentioned options offers an operator of this device, the ability to program his choice of alerts and messages and also enables the operator to chose the level or a range of levels of fuel (fuel) at which these alerts and messages are emitted or displayed by this device.

Descriptions of the terms used for the description of the following section of the invention;

The term set refers to the program stored in the memory of this device and this program is programmed and installed during the manufacture of this device or thereafter and does not permit the operators to select change or alter the programs. This programs when selected by an operator follows the instructions of the information and data programmed and stored in the memory/storage means of this device. Selecting this option reduces the time and skill level that is required by an operator required for programming more complex programs.

The term operator preset refers to the program stored in the memory of this device and this program enables an operator system to program the operators own values and also select from data available from the installed programs such as but not limited to selecting the distance between the vehicle and the fuel relishing location and the amount of fuel remaining when the alerts are emitted or sounded.

The term preset refers to the program stored in the memory of this device and this program enables an operator system to select from part or whole of data stored in the memory of this device to program the device The term preprogrammed proximity refers to instructions or formula to obtain distance between the physical location of the device and a fuel replenishing location that is selected by operators and recorded in the memory of this device or computed by the processing unit based upon the instructions installed in the memory of this device.

The term predetermined location refers to a location such as but not limited to a fuel relishing location which is selected by an operator of this device and recorded into the memory of this device or determined by the processing unit based upon the instructions installed in the memory of this device.

The functions described by the above terms are adapted to be available to the operators of this system as whole function, as a part of a function or as a combination of one or more of the The integration of the processor unit and the GPS navigation system unit and the means to connect to other connections such as but not limited to mobile network, cell phone network, Wi-Fi network and blue tooth connections (ENABLING RETRIEVING INFORMATION AND DATA AND INSTRUCTIONS FROM OTHER REMOTE SOURCE (HARDWARE AND SOFTWARE) further enabling the operator the following functions (h, I, j, l, m) and the operator of this device able to;

(h) program to alert and inform the operator when the fuel reaches or at or within an operator preset level or range of level and when this device is located physically within a preprogrammed proximity of predetermined location(s) (filling station(s)) which is programmed in to the memory of this device by the operator and to display a map, information and the direction to these location and the location(s), program to alert and inform the operator when the fuel reaches or at or within an operator preset level or range of level and the means for this device to display a map, information and the direction to these location and the location(s) fuel relishing locations, (i) program the device to alert and inform the operator when the fuel reaches or at or within a preset level or range and when this device is physically within a preprogrammed proximity of predetermined location(s) (filling station(s)) which is programmed by the operator and to display a map, messages, information and the direction and the location(s)

(j) program the device to alert and inform the operator when the fuel reaches or at or within an operator preset level or range and when this device is physically within a preprogrammed proximity of preset location(s) (filling station(s)) and to display a map, messages, information and the direction and the location(s)

(k) Program the device to alert and inform the operator when the fuel is at a preset level or range and when this device is physically within a preprogrammed proximity of preset location(s) (filling station(s)) and to display a map, information and the direction and the location(s)

(l) program the device to alert and inform the operator when the fuel is at a operator preset level or a range of levels set location(s) (filling station(s)) which is within a set or preset distance(s) and to display a map, messages, information and the direction to the location and the location(s)

(m) to program the alerts and messages to stay on or continue on or switch off upon leaving the above preset or predetermined areas and distances.

It is within the scope of this invention that other components and devices such as but not limited to an on board vehicle computer, its display system or GPS navigation system and other navigation systems in part or as whole be incorporated and be an integral part or component of this invention.

It is within the scope of this invention that this device in part or as whole be incorporated as an integral part(s) or component(s) of other components and devices such as but not limited to an on board vehicle computer, its display system or GPS navigation system and other navigation systems in part or as whole be incorporated in to this device keeping the spirit of this invention.

In consideration of the condition in which an operator may use this device and for convenience and safety of the operator, it is within the scope of this invention that part(s) and components of a unit of the device may be dispersed and located in various locations and or incorporated in to other systems, units or device such as but not limited to the dash board of a vehicle.

It is within the scope of this invention that not all the feature explained in this invention is included in one device or embodiment. One or more features may be omitted for economics, availability of other unrelated devices and component to share functions or preference of a user.

DETAILED DESCRIPTION OF DRAWINGS

Figure 1:
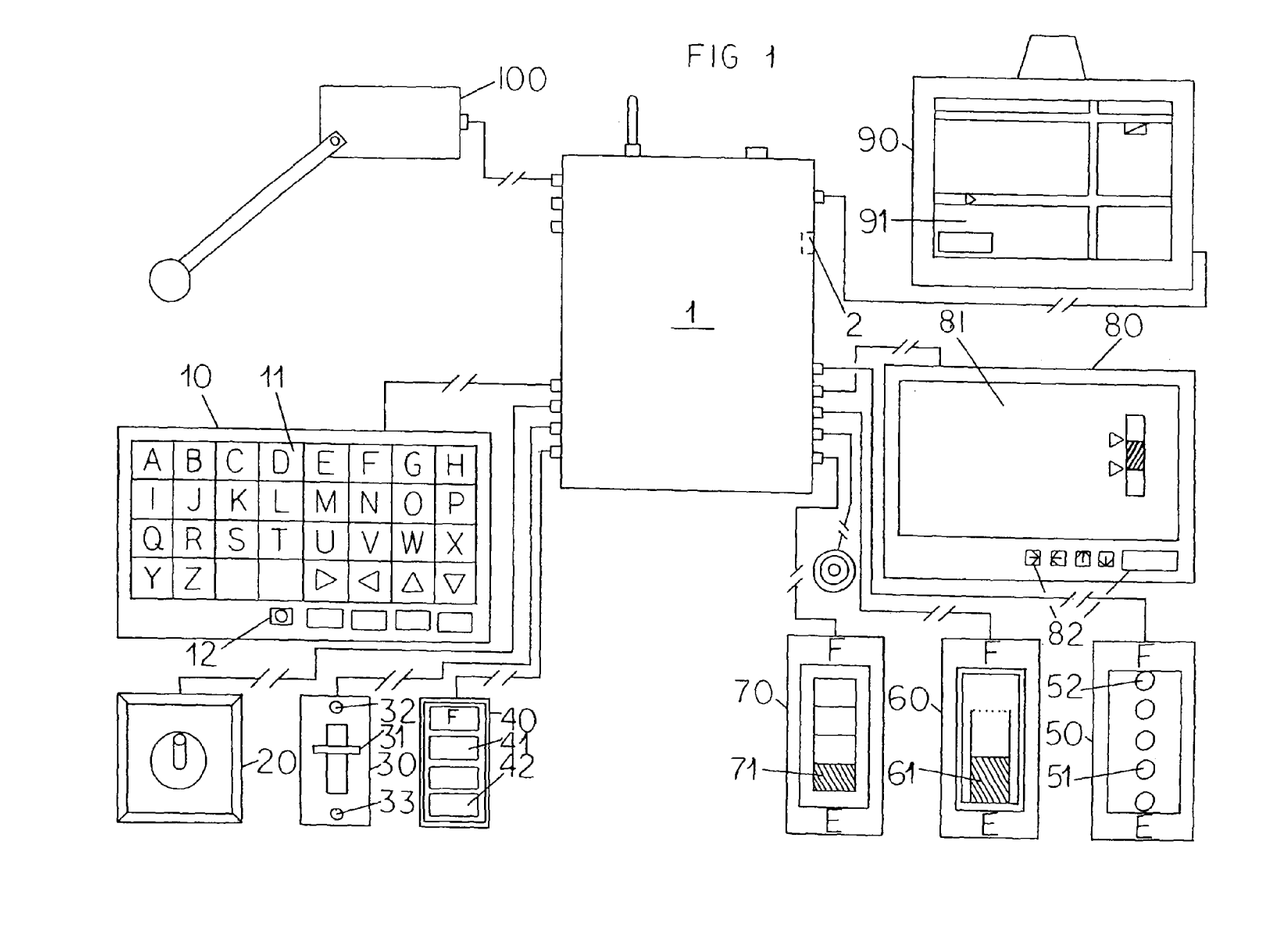
FIG. 1 is a schematic illustration of a fuel monitoring system constructed in accordance with the principles of the present invention.
Figure 2:
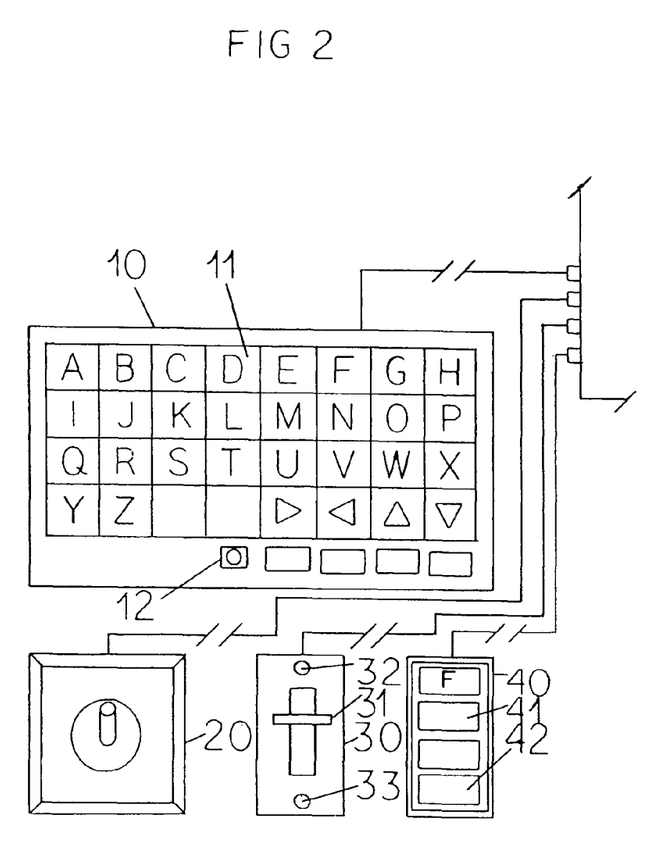
FIG. 2 is an enlarged showing of the keyboard and associated components as shown in FIG. 1.
Figure 3:
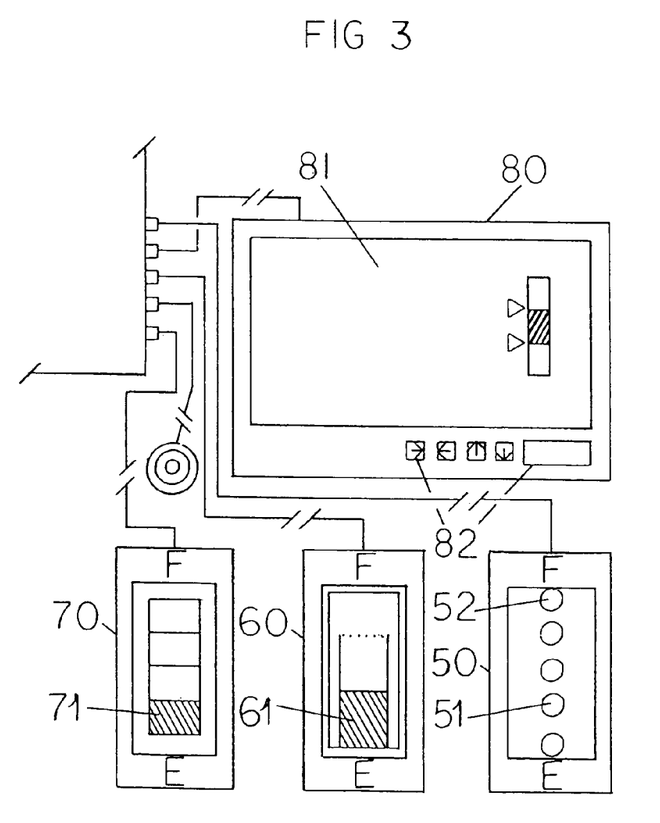
FIG. 3 is an enlarged showing of the keyboard and associated components as shown in FIG. 1.
Figure 4:
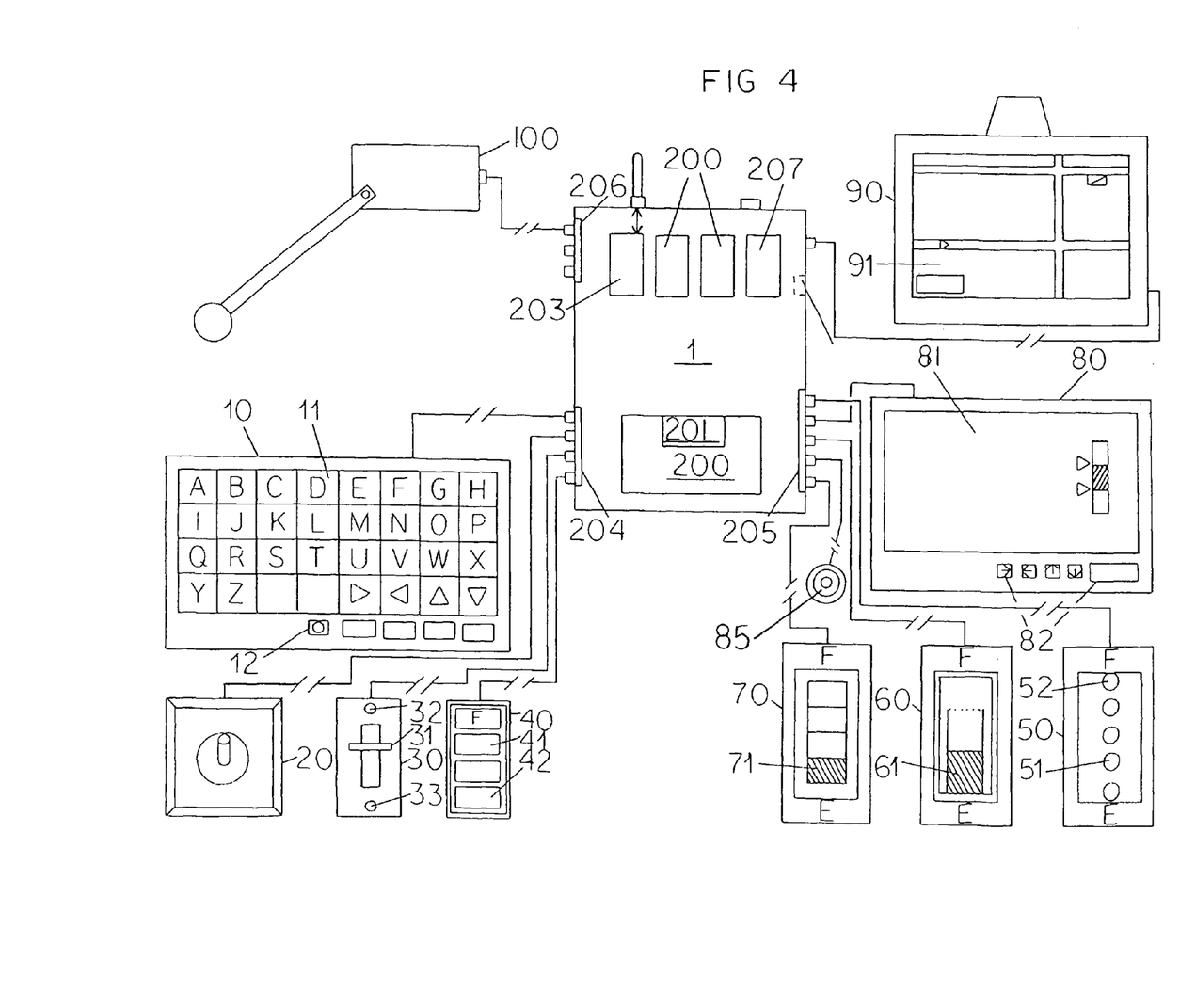
FIG. 4 is a schematic illustration similar to FIG. 1 but directed to an alternate embodiment of the invention.
Figure 5:
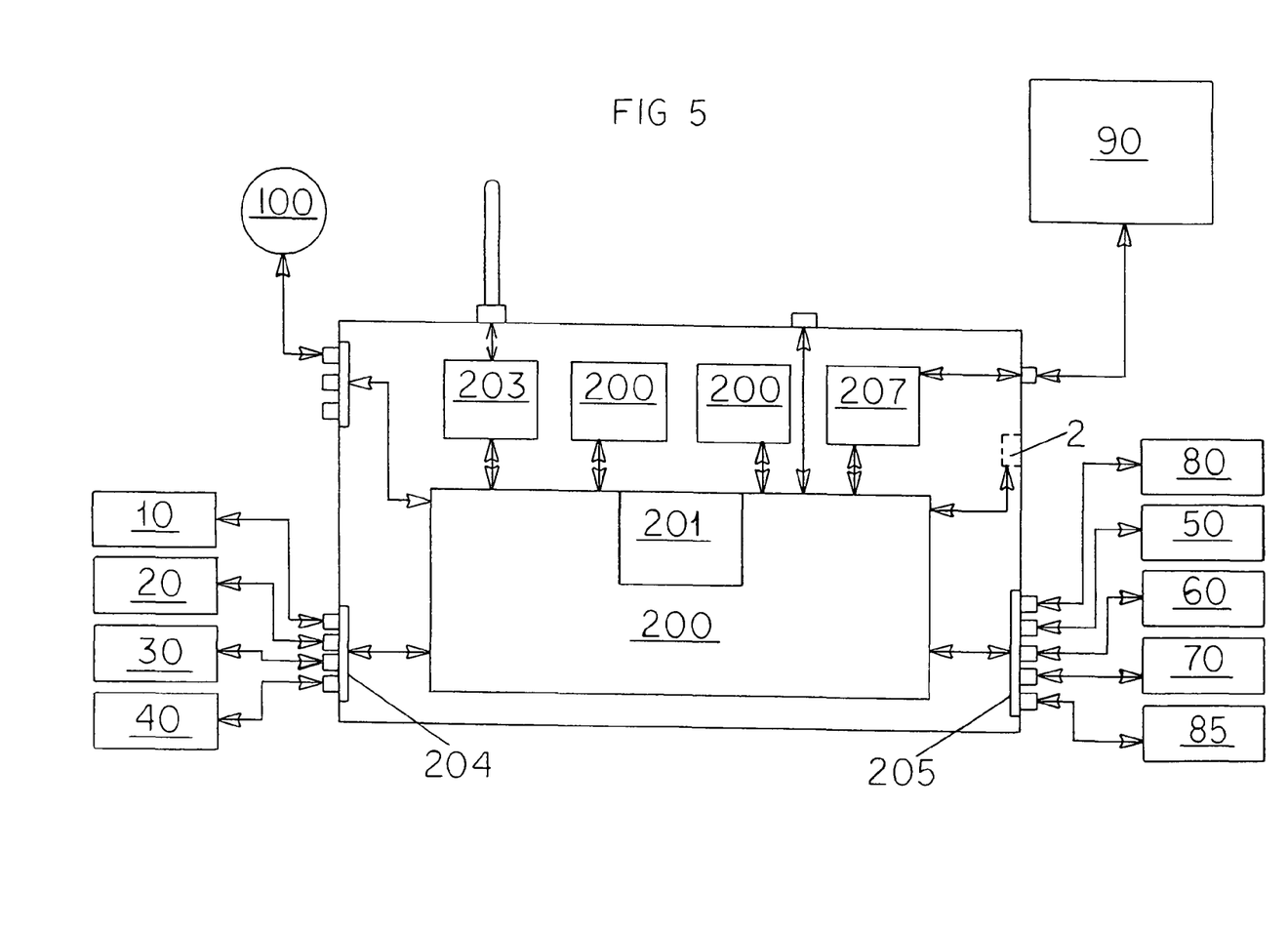
FIG. 5 is an enlarged showing of the central processing unit and related components shown in FIG. 4.

A device primarily used in vehicles such as automobiles and trucks comprising of units of systems such as a fuel level gauges units 100,101 102 and 103 a processing unit 1, display units 10,20,30,40, input units 50,60,70,80 and a GPS navigation unit 90. This device by means of audio and visual aids informs and or alerts the operator of the vehicles the levels or a range of levels of fuel and the device also having the means by which the operator can set and alter the range or the levels at which these information and or alerts are emitted and or displayed and also having the provision to change the type of information, messages and alerts including the volume and the (frequency) intervals of such alerts. The operators further have the option to program, record or input different or distinctive types of alerts for different levels and ranges of levels of fuel. The integration of the processor unit with a GPS navigation system unit enables an operator to obtain the location, direction and distance to fuel stations based upon factors such as the fuel level and distance to the fuel stations as determined by the operator.

DETAILED DESCRIPTION OF THE INVENTION

The following are the detailed description of the unit of systems described above:

The fuel level gauges units (100,101,102 and 103) capable of measuring (DETERMINING) the levels/volume of fuel and consisting of sensors and the interface and integration and integration software and hardware to transfer this data to a processing unit. The fuel level gauges located in the proximity of the fuel storage location of the fuel such as but not limited to the gas tank of a vehicle.

The processing unit 1, consisting of hardware, microprocessors, and software programs to analyze, process, integrate, interpret and to transmit the signals and data relayed from and to the fuel gauge unit, the display units, GPS systems unit and data entered through the input unit by an operator. The processor unit has means to 2 enhance or alter software programs through the use of USB ports (2.) The processing unit has a means for connections and for access to other external devices by means such as USB ports for functions such as but not limited to updating, modifying of the programming software and for coupling with other components and external devices.

The display units comprise multiple units of analog and digital display such as LCD lights and touch screens, bars and indicator lights which displays the data received from the processing unit and also data entered by an operator using the input unit described hereunder. The different displays are placed on various locations for safety and convenience of the operator. The first unit of the display unit has a display LCD monitor 80 capable of touch screen data input using the screen 81 and also has interactive programs for the operator to input data.

The second unit of the display unit has multiple LCD lights 51, 52 placed to indicate the fuel level between full as marked by the letter (F) and empty as marked by the letter (E) and the LCD lights 52 lights 51. The lighted lights which are shaded in the drawing give visual guidance for an operator to be able to select a desired range of level.

The third unit of the display unit has a bar graph light display placed to indicate that the level between full as marked by the letter (F) and empty as marked by the letter (E), the bar lights and or changes its color 61 (shaded area) gives a visual guidance for an operator to be able to select a desired (range of) level.

The fourth unit of the display unit has multiple lights 71 placed to indicate the level between full which is marked by the letter (F) and empty as marked by the letter (E) and the lighted lights are shaded in the drawing and these lights gives a visual guidance for an operator to be able to select a desired range of level. Each light in this unit is representing a range of fuel.

The input units consists of switches, key pads, touch screen inputs, joy sticks and a microphone 12 to record sounds and tones. These systems may be grouped and also dispersed at various locations for the convenience of the operator. The key pad 10 has multiple keys 11 enables an operator to record alpha and numerical messages and alerts.

The joystick 20 of the input unit assists in data input. The sliding key input 30 systems provide an easy and quick input of data for selecting a level or range of level of fuel. To select the lower point of the range of fuel the lever 31 is slid in to that position and then the push button switch 33 is pressed to select and record the lower level range point. The bar 31 is then moved and positioned at the top point of the range level and the push button switch 32 is pressed to select the upper point of the range of the fuel level and this is the starting point for the alerts or messages to begin.

The multiple key systems 40 of the input unit enables operator select only ranges of level of fuel, one key represents one range of fuel and pressing one of the keys 40, 41 enables the operator to select a particular range.

The microphone 12 enables an operator to record sounds and tones. The microphone 12 and voice recognizing software installed in the processing unit allows an operator to input data with voice commands.

A global positioning system (GPS) navigation system comprising of software and hardware programmed to interface and integrate with the processing unit of this device. This system has a LCD screen 91 that displays information and the touch sensitive screen enables an operator to input data. The integration of the GPS system and the processing also enables for an operator to input data in to the processing unit through the data entry means of the GPS system.

The units of the systems are adapted to be interconnected by wired means or by wireless means.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fuel gauge system comprising at least a fuel storage location, a fuel level gauges unit, a processing unit, display units, input units, a global positioning system, hereinafter GPS, navigation system unit and the means to operably connect to at least one other device and connection including a mobile network, cell phone network, Wi-Fi® network and Bluetooth® connections, having audio and visual outputs to inform and alert an operator of an amount of fuel in the fuel storage location, the processing unit being provided with means wherein the operator is adapted to manipulate and select and alter range of levels and point level when the operator is informed and alerted, the point level being an amount of remaining unconsumed fuel in the fuel storage location, the range of levels being a band of a plurality of levels of an amount of remaining unconsumed fuel in the fuel storage location, thus the operator of this system is being provided with the means to select ranges and level of fuel thus enabling the fuel gauge system to inform the operator with alerts as to remaining fuel in the fuel storage location and further inform the operator when a vehicle is driven within a selected distance to a selected fuel replenishing station, the ranges and levels are at which information of fuel condition are relayed, displayed, and alerts are being sounded and emitted, the processing unit further providing a choice to vary the alerts in volume and frequency of intervals, the system including:

the processing unit consisting of associated hardware, microprocessors, software, programmer means (200), memory/storage means (201), receiver/transmitter component (203) and integration hardware and software adapted to operably couple with the GPS, and operably connect and couple with other devices and with other network technologies including Wi-Fi, cell phone and smart phone and other computers (207) and the programmer means thus adapted to compute, analyze, process, integrate, interpret data and values and to transmit signals and data and alerts and further including display units and input units, GPS system unit and data being adapted to be entered through the input unit by the operator, the processing unit being provided with associated preprogrammed programs, data and instructions;

a plurality of fuel replenishing stations, the associated preprogrammed programs including means for selecting and choosing a fuel replenishing station and for determining a distance between the vehicle with the fuel storage location and the selected fuel replenishing station and informing the operator with the alerts when the associated vehicle enters within a distance selected by the operator the distance being a measure between the vehicle fuel replenishing station selected by the operator and further providing an operator a plurality of choices of selection of fuel level values, fuel level ranges and choice of fuel replenishing stations, thus the operator has the means to select from a plurality of choices of selection of the preprogrammed programs and the operator further has the means to manipulate to alter the preprogrammed programs and the processing unit further having the programs wherein an operator is adapted to enter and install additional programs providing selection of at least one point level of remaining unconsumed fuel and at least one of range of levels of remaining unconsumed fuel, the levels at which the alerts and information are emitted and displayed;

the display units operatively coupled to the processing unit and comprising multiple output units of analog and digital display including LCD lights, touch screens, bars and indicator lights which are adapted to display data received from the processing unit and also data entered by the operator, the displays for similar and different functions being located on more than one locations for safety and convenience for the operator;

consisting of switches, key pads, touch screen inputs, joysticks and a microphone, the plurality of input means being for similar and different functions are located in more than one location;

the fuel level gauge units comprising sensing components for measuring level of fuel in the fuel storage location including a float and a potentiometer operably coupled with the processing unit, the fuel level gauge units having the means to transmit and receive data wirelessly and through hard wiring, the GPS comprising software and hardware programmed to operably couple with the processing unit and the system further adapted to be operably connect to other connections and networks including mobile network, cell phone network, Wi-Fi® network and Bluetooth® connections and thus adapted to communicate and thus providing retrieving of data through such connections and also the indirect connections to the GPS to obtain GPS related data, the processing unit and the programs further having the means to be operatively coupled for obtaining necessary data in part or as a whole from more than one source and networks and further adapted to be operatively coupled with components of other systems including another computer system; and another fuel gauge of a vehicle; and the processing unit being operatively coupled to a USB port for providing the means to install, change, and alter software programs by of an external source.

2. The system as set forth in claim 1 wherein the system is adapted to be used in land vehicles including automobiles and trucks and adapted to be operably connected to other connections including the mobile network.

3. The system as set forth in claim 1 wherein the system comprising the plurality of audio and visual outputs is adapted to provide outputs to inform and alert the operator of a vehicle having this system of the data relevant and associated with the amount of remaining fuel that are at or within the operator of the system selected ranges and levels of fuel, the fuel being contained and remaining in the fuel storage location of the associated vehicle and the system further having the means wherein the operator, upon manipulation of this device, is able to select, set and alter the ranges of the fuel levels and these levels and ranges of the remaining fuel levels being the point and range that triggers the output of information and alerts, the processing unit is being adapted to provide the users with means to record voice messages and alerts and store the data in the memory of the processor units and further allowing to change the type of information, messages and alerts that are outputted and further allowing to vary the volume, the frequency and the intervals of such alerts.

4. The system as set forth in claim 1 wherein the processing unit allowing the operator of this system to select, program, record, and input a plurality of dissimilar and distinctive types of alerts for a plurality of levels and ranges of levels of unused fuel.

5. The system as set forth in claim 1 and further including software and hardware and components of this device operably coupled with other systems including an on board automobile computer and the GPS navigation system.

6. The system as set forth in claim 1 further including:
fuel level gauges units adapted for monitoring and for measuring the amount and the levels of fuel and comprising at least sensors and interface and integration software and hardware and operably couple with the processing unit, the term fuel referring to elements including liquids, solids, gas, vapor and electricity, plurality of fuel level gauges being provided for measuring the amount and the levels of plurality of forms of fuels;
a processing unit comprising hardware having means to be programmed and also having the means to alter and modify and change the software programs and comprising of hardware, microprocessors, and software programs to analyze, process, integrate and to transmit and receive the data and signals relayed to and from the fuel gauge unit, the display units, GPS system unit and data entered through the input unit by the operator;
display units comprising of the plurality of analog and digital display screens and indicator lights displaying the data and signals received from the processing unit and also data entered by the operator using the input unit described hereunder;
input units consisting of plurality of means to input data, program and select options by an operator by using the components including switches, key pads, touch screen input, joysticks and sound recording microphones, and voice recognizing software installed in the processing unit allowing an operator to input data via voice commands;
positioning system including global positioning navigation system comprising software and hardware programmed to operably couple with the processing unit of this device;
this system further having the means to connect to other connections including mobile network, cell phone/ SMARTPHONE network, WiFi® network and Bluetooth® network connections and thus enabling communication, retrieving data through such connections, and exchanging data through such connections and also enabling providing indirect connections to the positioning system including global positioning system (GPS) system to obtain data associated with positioning system (GPS) system related data, the processing units and the programs of the fuel gauge system further having the means for obtaining necessary associated data associated with the operation of this device in part or as a whole from more than one source and networks.

7. The system as set forth in claim 1 wherein upon manipulation of the input means, including input buttons, switches, touch screen, the joysticks and the microphone of the input means, the operator of this device, is being provided with plurality of choices to select and input data that are associated with the operational output pertaining to alerts and reminders, alerts and reminders in part being the information provided to operators of levels of remaining amounts of fuel of associated vehicles, which and thus the system being adapted to provide information reminds and alerts to the operator of the fuel gauge system by the means of audio and video visual outputs displays of messages and alerts when, and further providing the data associated with, the fuel level remaining in an associated vehicle and when the amount of fuel reaches the levels that are being selected and inputted by the operator and stored in the memory of this device for output of such remaining levels of fuel, an operator selected level and range of levels, and the operator is further:
(a) able to vary, alter, preset, set and select a level and range of levels of the fuel remaining at which audio and visual alerts are emitted and displayed and further able to select and choose the type of alerts, messages and information displayed and emitted which are associated with the functions of this device including pertaining to such selection of levels of selected amount of the fuel;
(b) able to select and set alerts for plurality of levels and ranges of levels of fuel remaining in the storage locations of associated vehicles and further having the means to display and emit plurality alerts and information including different plurality of distinctive colors and sounds for plurality fuel levels;
(c) able to vary, alter and select and install plurality of types of audio alerts, messages and the information that are being displayed;
(d) able to select and set the frequency of the alerts and vary the intervals of alerts and messages;
(e) able to adjust the volume of the alerts and messages;
(f) able to record sounds and tones~for alerts and messages; and
(g) able to select and set dissimilar alerts, tones and information for the plurality of levels of preselected ranges and levels of fuel remaining in storage of associated vehicles.

8. The system as set forth in claim 1 wherein operable coupling of the receiver/transmitter component with the processing unit is adapted to allow the processor unit to operably connect to other external and remote components and devices including an on board vehicle computer of associated vehicles, the display system of associated vehicles and global positioning system (GPS) system navigation system and other navigation systems are adapted to be combined and incorporated to be an integral part and component of the fuel gauge system.

9. The system as set forth in claim 1 wherein the system in part or as a whole is adapted to be combined and incorporated as an integral parts and components of other components and devices including an on board vehicle computer, the display systems of associated vehicles, cell/smart phones and global positioning system (GPS), and other navigation systems be incorporated into the system keeping within the spirit of this invention and further adapted to operably share functions and components in part or as a whole with other components and devices including smart phones.

10. The system as set forth in claim 1 wherein, in consideration of the condition in which an operator may use this device and for convenience and safety of the operator, that parts and components of a unit of the device are adapted to be dispersed and located in plurality of various locations and further incorporated and located in to other systems, units and device including the dash board of a vehicle.

11. The system as set forth in claim 1 wherein the system is adapted for having one and more alternative features and functions that may be omitted for plurality of reasons including economics and availability of other unrelated devices and components;
the fuel gauge system is provided with three modes;
A. the first mode of the fuel gauge system the primary function is being restricted to generally having outputs of alerts and reminder for informing the users of remaining unused fuel level dropping to and below the user preselected remaining fuel level, or B. the second mode of the fuel gauge system the active coupling of the positioning system providing the users information, alerts and reminders prompting to visit fuel station for replenishing fuel and these reminders are being provided upon the vehicles associated with the fuel gauge systems being driven to the area that is located within a preselected distance, or C. the third mode being consisting of combination functions in part or as a whole of the functions that are described in the first and second modes wherein, in the third mode of the fuel gauge system the functions include having outputs of alerts and reminder for informing the users of remaining unused fuel level dropping to and below the user preselected remaining fuel level and the active coupling of the positioning system further providing the users information, alerts and reminders to prompt the users to visit fuel station for replenishing fuel and these reminders are being activated upon the vehicle associated with the fuel gauge system being driven to the area that is within a preselected distance.

12. The system as set forth in claim 1 wherein the programs that are being installed in the processing units are further adapted to provide a temporary pause/stop mode, wherein the operators of this system upon selecting this function is able to pause/stop the output of alerts and displays pertaining to and associated with the level of remaining fuel amount for a temporary period of time and the programs which are installed in the memory of the processing units are further adapted to start and resume the these alerts when the operator selected level amount of remaining fuel further drops to a level at or below the range that is preselected and stored in the memory as the operator preselected level, the processing unit and the programs installed in the processing units are further adapted to resume such alerts which are being temporarily placed on pause and being stopped after this system and the vehicle in which this system is associated with is switched off and stopped and then turned back on and started again.

13. The system as set forth in claim 1 wherein the operable coupling of the receiver/transmitter component with the processing unit, is further adapted to having the means for operably connecting to other external devices and thus allowing access to connect to other external devices for sharing functions and exchanging of data including updating, modifying of the programming software and for coupling with other components and external devices.

\* \* \* \* \*